United States Patent [19]

Clarke

[11] 4,094,150

[45] June 13, 1978

[54] COMPOSITION OF MATTER USEFUL FOR EARTHEN FORMATION TREATMENT

[75] Inventor: William J. Clarke, Ridgewood, N.J.

[73] Assignee: American Cyanamid Company, Stamford, Conn.

[21] Appl. No.: 677,355

[22] Filed: Apr. 15, 1976

[51] Int. Cl.² .............................................. C08L 35/00
[52] U.S. Cl. ...................................... 61/36 C; 166/295;
260/29.6 HN; 260/29.6 M; 260/29.7 H;
260/29.7 M
[58] Field of Search ................. 260/29.6 HN, 29.6 M,
260/29.7 H, 29.7 M; 61/36 C; 166/295

[56] References Cited

U.S. PATENT DOCUMENTS

| | | | |
|---|---|---|---|
| 3,056,757 | 10/1962 | Rakowitz | 260/42.12 |
| 3,136,360 | 6/1964 | Ramos et al. | 166/295 |
| 3,223,163 | 12/1965 | Koch et al. | 260/42.12 |
| 3,373,814 | 3/1968 | Eilers et al. | 166/295 |

*Primary Examiner*—M. J. Welsh
*Attorney, Agent, or Firm*—James T. Dunn; John L. Sullivan

[57] ABSTRACT

A gel-forming composition of matter comprising an aqueous solution of a mixture of certain percentages of monomeric acrylamide and monomeric N,N' methylenebisacrylamide and a polymerization catalyst and containing certain percentages of an unfired natural diatomaceous earth having a certain particle size is used in treating earthen formations around the joints of sewer pipes, whereby fluid loss from the composition into the earthen formation is substantially reduced.

7 Claims, No Drawings

COMPOSITION OF MATTER USEFUL FOR EARTHEN FORMATION TREATMENT

BACKGROUND OF THE INVENTION

Mixtures of acrylamide and N,N'methylenebisacrylamide dispersed in an aqueous medium have been catalyzed and injected into earthen formations for a plurality of years wherein the aqueous solution is catalyzed with a sufficient amount of the polymerization catalyst so as to cause the mixture of monomeric acrylamide and the monomeric bisacrylamide to form a substantial gelled material in the earthen formation and thereby block the permeation of water in the area of the gel. The aqueous solutions of this mixture of monomers have been used with various additives in order to achieve various diverse effects in the earthen formations. These uses vary from stabilization of the soil, waterproofing of concrete or masonry surfaces, hydraulic cement compositions, for the prevention of gas loss during gas drilling and other drilling operations such as oil wells and the like.

1. Field of the Invention

The present invention is in the field of a treatment of earthen formations, and more particularly, earthen formations around sanitary sewer joints that are filled with said gel to control ground water infiltration. The invention also covers said gel in a dried soil application where there is no water in the storm sewer joint and the soil around the sewer is dry.

2. Description of the Prior Art

The idea of using mixtures of acrylamide and N,N'methylenebisacrylamide in aqueous solutions for the stabilization of soil was developed in the early 1950's. Reference is made to the U.S. Pat. Nos. 2,801,983; 2,801,984; 2,801,985; 2,868,753; 2,940,729; 3,056,757; 3,136,360; and 3,223,163, all of which patents are incorporated herein by reference.

SUMMARY OF THE INVENTION

This invention relates to a composition of matter comprising an aqueous solution containing from about 5% to about 20%, by weight, based on the total weight of the solution of a mixture of (A) from about 80% to 99.5%, by weight, of monomeric acrylamide and correspondingly (B) from about 20% to 0.5% by weight of monomeric N,N'methylenebisacrylamide wherein the percentages by weight of said monomers total 100%, and (C) from about 4% and 20%, by weight, of an unfired natural diatomaceous earth, 80 percent of which, having a particle size between about $2\mu$ and $10\mu$ and the percentage by weight of said diatomaceous earth is based on the total weight of the solution. This invention also relates to the use of this composition in a catalyzed state in the treatment of earth formations. This invention also relates to compositions of matter containing the mixtures of the monomers in an aqueous solution containing the said unfired natural diatomaceous earth in conjunction with an inorganic, hydrated water-soluble metal salt wherein said metal is selected from the group consisting of alkaline earth metals, aluminum and chromium in certain percentages.

The monomeric acrylamide is used in combination with the monomeric N,N'methylenebisacrylamide in a weight ratio of between about 80% to 99.5% : 20% to 0.5% respectively wherein these percentages are by weight and total 100%. It is preferred to use the acrylamide in a weight ratio varying between 85% and 96% and the N,N'methylenebisacrylamide correspondingly between about 15% and 4%. For optimum results, the acrylamide is used in a weight ratio of 95% and the N,N'methylenebisacrylamide is used correspondingly in a weight ratio of 5% wherein the percentages are always based on the total weight of the two monomeric matials. The amount of the mixture of these monomers in the aqueous solution may be varied between about 5% and 20%, by weight, based on the total weight of the solution of the monomer mixture in the water. It is preferred to use between about 8% an 15%, by weight, of the monomers based on the total weight of the monomer mixture in solution. The mixture of the monomeric acrylamide and the monomeric N,N'methylenebisacrylamide is a commercially available material and is designated as AM-9 for the sake of brevity. Cyanamid AM-9 is a trademark used by American Cyanamid Company to identify its chemical grout.

The diatomaceous earth used in the composition of the present invention is an unfired natural diatomaceous earth, 80 percent of which, having a particle size between about $2\mu$ and $10\mu$ and used in an amount varying between about 4% and 20%, by weight, based on the total weight of the solution of the AM-9. When a diatomaceous earth material is first recovered from nature, it is washed and sold with its natural properties or it is fired to change its properties. When the diatomaceous earth material is to be fired, it is introduced into a kiln and the kiln is heated at a temperature varying between about 1700° and 1900° F. for a period of time varying between about 10 minutes and about 60 minutes. During this firing step, the organic materials contained within the natural diatomaceous earth are burned off and the particle size of the diatomaceous earth is changed. The particle size is increased as a result of the firing step. The surface properties of the diatomaceous earth are also changed during the firing step which causes the fired material to settle out of a dispersion in water very quickly. The unfired diatomaceous earth settles very slowly in water as compared to the fired diatomaceous earth. This change in the surface properties of the diatomaceous earth causes it to settle out very quickly in grouting equipment which is used in the field. For the purposes of the present invention, there is needed a non-settling diatomaceous earth system in order to give a practical system for applying this chemical grout to grouting sewer joints in the field. It is theorized that during the kiln firing step that the surface properties of the diatomaceous earth are changed, the particles agglomerate and their surface area is reduced. These larger diatomaceous earth particles filter out undissolved solids from the AM-9 solution and allow the remaining solution to penetrate further into the stabilized mass; thereby increasing fluid loss.

In the U.S. Pat. No. 3,136,360, issued in the name of Ramos and McLaughlin, the diatomaceous materials, which they disclosed, are the fired diatomaceous earth materials and they use these materials because they are interested in substantially increasing the fluid loss of their composition in the earthen formation that is being treated. When the larger size particles of fired diatomaceous earth are used, the tendency to "blind" is minimized and, therefore, the fluids can penetrate through the particle size agglomerates and this results in the increased fluid loss. The expression "blind" is used to identify that situation when one fills up the holes with small particles and thereby prevents the fluid from being lost. The use of such large particle size fired diatomaceous earth markedly improves the penetration of the AM-9 solution into the earthen formation whereas when the unfired diatomaceous earth material of much smaller particle size is used, the total composition blinds the holes by filling them up and reduces the penetration. The total composition, when blinded, stays where it is injected in the earthen formation and becomes gelled therein due to the presence of the catalytic material and the resulting gel protects the sewer pipes. Ramos et al. state that they use the finely-divided water-inert filter aid material in sufficient quantity to substantially increase the fluid loss of said composition into the formation to be treated. Ramos et al. make use of relatively small percentages of their fired diatomaceous earth material. The largest amount that Ramos et al. utilize is 10 grams which is calculated to be about 1% based on a 1,000 g. total solution. The smallest amount that Ramos et al. utilize is 0.75 grams which is about 0.075%. These quantities are shown in Table 1 of the above-cited Ramos et al. patent. Ramos et al., therefore, utilize smaller percentages of larger particle size of a fired diatomaceous earth material whereas in the present invention much larger quantities of smaller particle size unfired diatomaceous earth is utilized for a completely different purpose, namely, to reduce the penetration and to keep the composition where it is required until it has gelled and, thereby, protecting the sewer pipes which it surrounds to prevent ground water infiltration. The amount of the unfired natural diatomaceous earth that is used in the composition of the present invention will vary between about 4% and 20%, by weight, based on the total weight of the AM-9 solution. It is preferred to use between about 8% and 15% of the unfired diatomaceous earth material, by weight, based on the total weight of the AM-9 aqueous solution.

Reference is made hereinabove to the U.S. Pat. No. 3,056,757 which discloses and claims the use of certain inorganic, hydrated, water-soluble metal salts in an AM-9 solution wherein said metal is selected from the group consisting of alkaline earth metals, aluminum and chromium and said salt is present in a weight ratio of said monomer mix to said salt in the range between about 1:1.5 to about 1:12 respectively. This means that when there is 5% of the AM-9 in the aqueous solution, one may use as little as 7.5% of the salt in the solution. The upper amount of the metal salt which may be used in the composition of the present invention may be as high as about 240% by weight based on the total amount of the monomer mixture present in the solution. The above-cited patent, which is incorporated herein by reference, shows the use of percentages varying between about 0% to about 40%, by weight, of calcium chloride based on the total weight of the gel of the AM-9.

The inorganic, solid, hydrated, water-soluble metal salt, such as calcium chloride that is used in combination with the said diatomaceous earth is preferably used in an amount varying between 5% and 10%, by weight, based on the total weight of the aqueous solution of the mixture of the monomers.

The catalyst used in the composition of the present invention just prior to its use and injection into an earthen formation can be any one of a plurality of well-known catalysts and catalyst combinations that have been used with AM-9 compositions over a period of years. One of the most frequently used catalyst systems is a redox system comprising a mixture of ammonium persulphate and sodium thiosulphate or a mixture of ammonium persulphate and sodium bisulfite. The amount of the catalyst used can be varied considerably depending on the type of gel one wishes to produce and the speed of the gellation. These gels may be in the form of a slurry, a thick solid, a rubbery solid or a stiff solid. Ordinarily, one would use between about 0.01% to about 10.0%, by weight, based on the total weight of the polymerizable monomer mix. It is preferred to use about 1% to about 2%, by weight, same basis. If desired, one may make use of any of the conventionally available peroxide catalysts as the catalytic material for the polymerization of the monomer mix, such as benzoyl peroxide, tertiary butyl hydroxide, tertiary butylhydroperoxide, and the like. The U.S. Pat. No. 2,940,729 illustrates a plurality of additional catalytic materials which can be used in the composition of the present invention immediately prior to use. Said patent is incorporated herein by reference.

The type of earthen material that can be treated with the composition of the present invention may be sand, kaolnite, Ventura clay, Connecticut top soil and the like. When the compositions of the present invention are being used near sewer pipes, and more particularly, storm sewer pipes, such pipes are frequently embedded in crushed stone. It is in such an application that the calcium chloride proves to be most effective since the use of calcium chloride in combination with the unfired natural diatomaceous earth enables one to control the shrinkage in the dry soil application where there is no water and in the storm sewer joint where the soil or crushed stone around the sewer joint is dry. The unfired natural diatomaceous earth used in the composition of the present invention gives increased strength to the gel ultimately produced in situ, especially when it is used in earthen formations composed principally of crushed stone, namely, open sewer joints that are embedded in said crushed stone.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE I

Into a suitable mixing vessel, there is introduced 342 parts of water, 95 parts of monomeric acrylamide, 5 parts of N,N'methylenebisacrylamide, 8 parts of dimethylaminopropionitrile and 50 parts of a commercially available unfired natural diatomaceous earth material having a particle size of about 80% between $2\mu-10\mu$. The four materials are blended together to make a substantially homogeneous blend. In a separate mixing vessel there is introduced 440 parts of water, 50 parts of the same type of unfired diatomaceous earth introduced into the first mixing tank and 10 parts of ammonium persulfate. The ingredients in the second mixing tank are thoroughly blended together to produce a substantially homogeneous stable suspension. The two mixtures are withdrawn separately from their mixing tanks and are blended together just before the time when they are injected into a soil formation around a sewer joint in order to direct the infiltration of the ground water into the joint. The soil temperature is about 60° F. and the gel time at that temperature is about 30 seconds. There results around the sewer joints that are embedded in crushed stone, the required grout with increased viscosity, which had the required strength and blinding action so as to cause the grout to gel close to the sewer joint.

EXAMPLE II

Into a suitable mixing vessel there is introduced 266 parts of water, 95 parts of monomeric acrylamide, five parts of N,N'methylenebisacrylamide, four parts of dimethylaminopropionitrile, 100 parts of calcium chloride and 30 parts of unfired natural diatomaceous earth having a particle size, of about 80%, between $2\mu$ and $10\mu$. The components are thoroughly blended together to make a stable suspension. Into a separate mixing vessel, there is introduced 352 parts of water, 8 parts of ammonium persulfate, 100 parts of calcium chloride and 40 parts of the same commercially available unfired natural diatomaceous earth material used in the first tank having a particle size average, about 80%, between $2\mu$ and $10\mu$. The contents of the second mixing vessel are thoroughly blended to produce a stable suspension. The contents of the two mixing vessels are then blended together, at the moment of use, and are introduced into an earthen formation having a temperature of about 60° F. and the composition gels in about 20 seconds. The resulting grout had increased strength viscosity and blinding action so as to cause the grout to gel close to a sewer joint.

To the compositions of the present invention one may add other inert or active solids, including polymers, copolymers, crosslinking agents, inhibitors, root inhibitors, shelf life stabilizers for the liquid AM-9 and the like. This is done to increase the utility of the AM-9 based grouting system in order to control infiltration in sewer joints, to control underground water flow, to stabilize solids and to increase the strength of stabilized soils.

I claim:

1. A method for treating earth formations around the joints of underground pipes and concrete foundations comprising injecting into the earth formation a gel-forming composition comprising an aqueous solution containing from about 5% to about 20%, by weight, based on the total weight of the solution of a mixture of (A) from about 80% to 99.5%, by weight, of monomeric acrylamide and correspondingly (B) from about 20% to 0.5% by weight of monomeric N,N'-methylenebisacrylamide wherein the percentages by weight of said monomers total 100%, and (C) from about 4% to 20%, by weight, of an unfired natural diatomaceous earth, 80% of which has a particle size between about $2\mu$ and $10\mu$ the percentage by weight of said diatomaceous earth being based on the total weight of the solution and (D) an effective amount of a polymerization catalyst, whereby fluid loss from the gelled composition into the earth formations is substantially reduced.

2. A method according to claim 1 wherein the amount of the monomer mixture present in the solution is between 8% and 15% by weight.

3. A method according to claim 1 wherein the amount of acrylamide is between about 85% and 96% and the amount of the N,N'methylenebisacrylamide is correspondingly between about 15% and 4%.

4. A method according to claim 1 in which said diatomaceous earth is present in an amount between about 8% and 15% by weight based on the total weight of the monomer mixture aqueous solution.

5. A method according to claim 1 wherein the aqueous solution contains an inorganic, hydrated, water-soluble metal salt wherein said metal is selected from the group consisting of alkaline earth metals, aluminum and chromium and said salt is present in a weight ratio of said monomer mix to said salt in the range between about 1:1.5 to 1:12 respectively.

6. A method according to claim 5 wherein said inorganic, hydrated, water-soluble metal salt is calcium chloride.

7. A method according to claim 1 wherein said earth formation is in contact with a sewer pipe.

* * * * *